US011397798B2

(12) United States Patent
Lazzaro et al.

(10) Patent No.: US 11,397,798 B2
(45) Date of Patent: Jul. 26, 2022

(54) PROVIDING ACCESS OF AN APPLICATION BASED ON REAL WORLD ACTIONS IN IOT COLLABORATIVE ENVIRONMENT

(71) Applicant: HCL TECHNOLOGIES ITALY S.P.A., Milan (IT)

(72) Inventors: Luca Lazzaro, Rome (IT); Francesco Brillante, Rome (IT); Stefania Benedetta Stasi, Rome (IT); Ciro Oliviero, Rome (IT); Roberto Francesco Lenci, Rome (IT); Elvira Zanin, Rome (IT)

(73) Assignee: HCL TECHNOLOGIES ITALY S.P.A., Milan (IT)

( * ) Notice: Subject to any disclaimer, the term of this patent is extended or adjusted under 35 U.S.C. 154(b) by 145 days.

(21) Appl. No.: 16/565,906

(22) Filed: Sep. 10, 2019

(65) Prior Publication Data
US 2021/0073361 A1 Mar. 11, 2021

(51) Int. Cl.
*G06F 21/31* (2013.01)

(52) U.S. Cl.
CPC .... *G06F 21/316* (2013.01); *G06F 2221/2133* (2013.01)

(58) Field of Classification Search
CPC ........... G06F 21/316; G06F 2221/2133; G06F 2221/2111
USPC ........................................................ 726/18
See application file for complete search history.

(56) References Cited

U.S. PATENT DOCUMENTS

| 8,245,277 | B2 | 8/2012 | Lazar et al. |
| 8,601,538 | B2 | 12/2013 | Qvarfordt et al. |
| 9,591,035 | B2 | 3/2017 | Kuo et al. |
| 10,257,229 | B1* | 4/2019 | Kuo ...................... H04W 12/06 |
| 2011/0298691 | A1* | 12/2011 | DeLuca .................. G06F 21/36 345/1.3 |
| 2013/0036342 | A1 | 2/2013 | Deo et al. |
| 2016/0006744 | A1* | 1/2016 | Du .......................... H04L 51/04 726/4 |
| 2017/0180348 | A1* | 6/2017 | Piccolotto .......... G06K 9/00355 |
| 2017/0237770 | A1 | 8/2017 | Meriac |
| 2018/0278574 | A1 | 9/2018 | Neumann et al. |

* cited by examiner

*Primary Examiner* — Jacob Lipman
(74) *Attorney, Agent, or Firm* — Kendal Sheets

(57) ABSTRACT

The present disclosure relates to system(s) and method(s) for providing access of an application to a user. The system receives a captcha request from a user device. Upon receiving the captcha request, the system identifies a set of IOT devices in a vicinity of the user device. The system further identifies one or more actions associated with one or more IOT devices, from the set of IOT devices. Further, the system generates a captcha message on the user device. The captcha message comprises the one or more actions to be performed by a user. The system further verifies one or more results received from the one or more IOT devices. Further, the system provides an access of the target application to the user on the user device based on the validation of the one or more results.

10 Claims, 3 Drawing Sheets

US 11,397,798 B2

PROVIDING ACCESS OF AN APPLICATION BASED ON REAL WORLD ACTIONS IN IOT COLLABORATIVE ENVIRONMENT

TECHNICAL FIELD

The present disclosure in general relates to the field of a human interactive proof technology. More particularly, the present invention relates to a system and method for providing access of an application based on real world actions in IOT collaborative environment.

BACKGROUND

Generally, a CAPTCHA is a type of challenge-response test that is used in order to determine whether or not a user is human. Typically, the CAPTCHA may require the user to type some characters that are presented to the user. Some CAPTCHA may require the user to recognise one or more images associated with a particular scene presented to the user. It is to be noted that, the type of CAPTCHA that is presented to the user may be based on an application the user wants to access. However, the type of CAPTCHA is not presented based on a user profile. In such cases, some users such as blind people may face problems. They may not be able to complete the CAPTCHA challenge and cannot access the application. It is to be noted that the currently available CAPTCHA challenge may not be useful for everyone.

SUMMARY

Before the present systems and methods for providing an access of an application to a user, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for providing an access of the application to the users. This summary is not intended to identify essential features of the claimed subject matter nor is it intended for use in determining or limiting the scope of the claimed subject matter.

In one implementation, a method for providing an access of an application to a user is illustrated. In one embodiment, the method may comprise receiving a captcha request from a user device. The captcha request may be received when a user tries to access a target application. The method may further comprise identifying a set of IOT devices in a vicinity of the user device upon receiving the captcha request. The set of IOT devices may be identified based on a location of the user device. Further, the method may comprise identifying one or more actions associated with one or more IOT devices, from the set of IOT devices. The one or more actions may be identified based on an analysis of the one or more IOT devices. Furthermore, the method may comprises generating a captcha message on the user device. The captcha message may comprise the one or more actions to be performed by the user. The method may further comprise verifying one or more results received from the one or more IOT devices. The one or more results may be received based on the one or more actions performed by the user in real-time. Further, the method may comprise providing an access of the target application to the user on the user device based on the validation of the one or more results.

In one implementation, a system for providing an access of an application to a user is illustrated. The system comprises a memory and a processor coupled to the memory, further the processor is configured to execute instructions stored in the memory. In one embodiment, the processor may execute instructions stored in the memory for receiving a captcha request from a user device. The captcha request may be received when a user tries to access a target application. The processor may further execute instructions stored in the memory for identifying a set of IOT devices in a vicinity of the user device upon receiving the captcha request. The set of IOT devices may be identified based on a location of the user device. Further, the processor may execute instructions stored in the memory for identifying one or more actions associated with one or more IOT devices, from the set of IOT devices. The one or more actions may be identified based on an analysis of the one or more OT devices. Furthermore, the processor may execute instructions stored in the memory for generating a captcha message on the user device. The captcha message may comprise the one or more actions to be performed by the user. The processor may further execute instructions stored in the memory for verifying one or more results received from the one or more IOT devices. The one or more results may be received based on the one or more actions performed by the user in real-time. Further, the processor may execute instructions stored in the providing an access of the target application to the user on the user device based on the validation of the one or more results.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "comprising", "consisting", "including", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for providing an access of an application to a user are now described. The disclosed embodiments of the system and method for providing the access of the application to the user are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for providing the access of the application to the user is not intended to be limited to the embodiments illustrated, but is to be accorded the widest scope consistent with the principles and features described herein.

The present subject matter relates to providing an access of an application to the user. In one embodiment, a captcha request is received from a user device. The captcha request is received, when the user tries to access a target application. Based on the captcha request, a set of IOT devices in a vicinity of the user device may be identified. One or more action associated with one or more IOT devices, from the set of IOT devices, may be identified. The one or more IOT devices may be nearest to the user device. Further, a captcha message may be generated on the user device. The captcha message may comprise the one or more actions to be performed by the user. One or more results may be received from the one or more IOT devices, when the user performs the one or more actions associated with the captcha message. The one or more results may be further verified. Based on the verification, an access of the target application is allowed or denied for the user.

Figure 1:
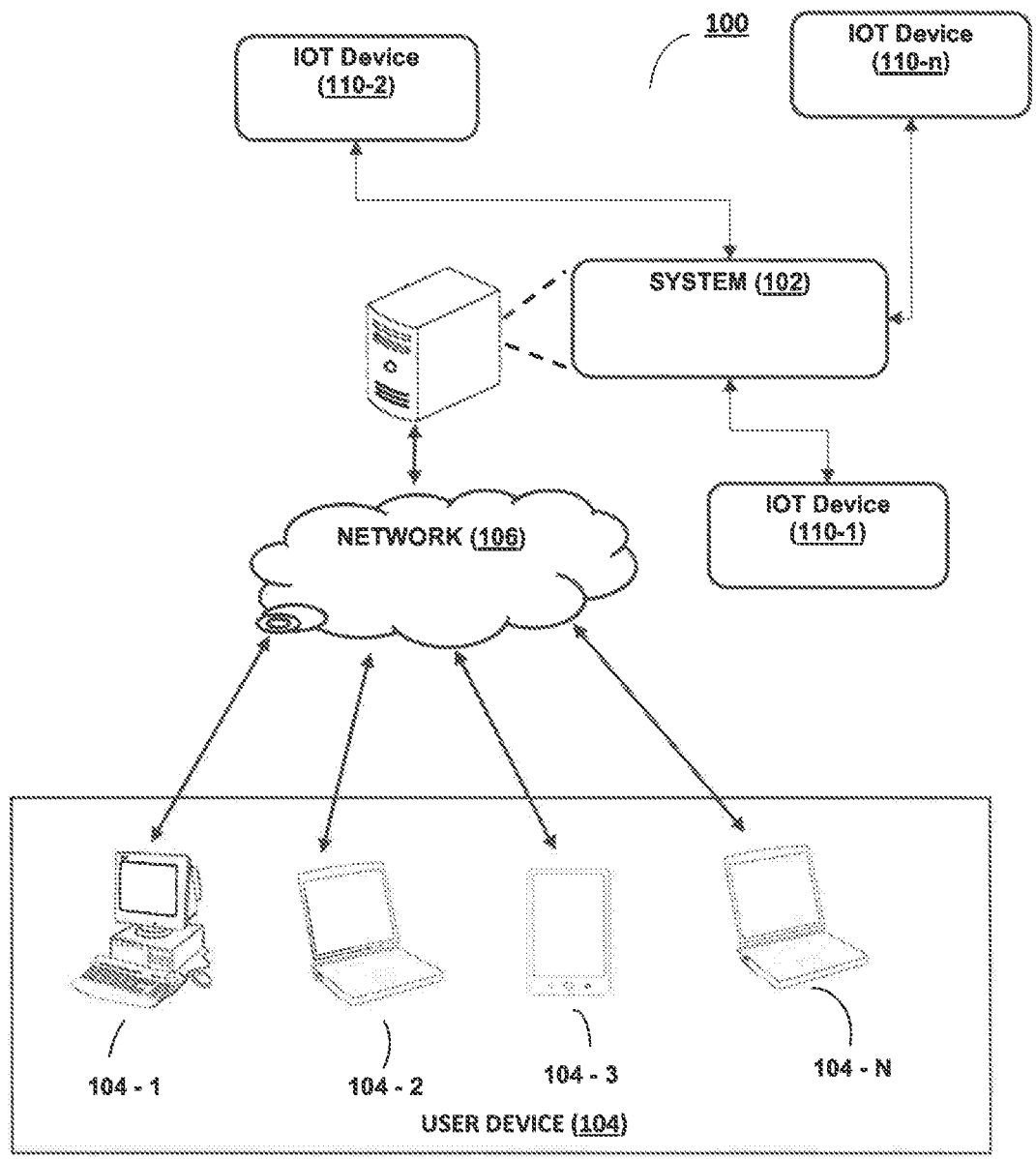
FIG. 1 illustrates a network implementation of a system for providing an access of an application to a user, in accordance with an embodiment of the present subject matter.

Referring now to FIG. 1, a network implementation 100 of a system 102 for allowing an access of an application to a user is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be connected to a set of Internet-of-Things (IOT) devices 110-1, 110-2, . . . , 110-n, hereinafter referred as a IOT device 110.

Each IOT device may communicate with the system using sensors. The set of IOT devices may communicate with each other using the sensors. In one example, the IOT device 110 may be a smartwatch, a camera, a smart TV and the like.

In one embodiment, the system 102 may be referred as a IOT Captcha Manager. The system 102 may be installed on each user device 104 that is connected to a local network or to a cloud. The user devices 104 may be able to communicate with all the surrounding JOT devices 110. It is to be noted that the communication may be done using cloud protocols, notifications or local network standards. This component can enumerate the IOT devices 110 present around the user. It knows all the possible interactions on and between those. Moreover, it may be understood that if the interactions between the user and one or multiple devices have been correctly executed. The system 102 may understand the interaction patterns between IOT devices 110.

Further, the system 102 may be connected to a captcha requester. In one aspect, the captcha requester may be installed on the server, when an application is based on a client-server architecture. In another aspect, the captcha requester may be installed locally, when the application runs on a client side. The captcha requester may be configured to add a Turing test to the system 102. The Turing test may have a role to establish a trust relationship with the captcha manager, on which the user is able to interact in his surrounding area.

The captcha may be configured to received actions associated with the IOT device 110. Further, the Turing test mat be executed on a target application that the user wishes to access.

In one aspect, the Turing test may be based on an idea to "challenge" the user with an action or sequence of actions that needs to be executed in a real world. Further, an information associated with the fact that the action was made correctly or not using a group of intelligent devices i.e. IOT device 10 that are physically around the user.

In one embodiment, a user may want to access a website or an application. Before connecting to the website or the application, a Turing test needs to be performed. The Turing test is performed to realize which kind of objects can be included in the test and which one are the available actions.

The Turing test discovery may be carried out in a real environment of the user. The Turing test includes finding IOT devices 110 that are easy to access from a position of the user. In one example, construe that the user is in an office. In the embodiment, the IOT devices 110 in a vicinity of the user may be a smart TV, a smartwatch, a light control, a room temperature system, a remote controller or a smartphone. It is to be noted that in public environments, other kind of IOT devices may be used such as cameras, smart tables, and the like.

Once the IOT devices 110 are defined, one or more actions associated with the on the IOT devices 110 may be discovered. In one example, the action may be to lift the smartphone from a table or to turn ON the light. Upon identification of the action, an information of the action may be used to prompt the user to execute the action in the real-world environment. Further, through a collaboration between TOT devices, the correct execution of the Turing test may be verified. If the test is positive the interaction is considered made by a human being. Based on the verification, an access of the website or the application may be provided to the user.

In other embodiment of the present subject matter, the system for providing the access of an application to the user is illustrated with an example. In the example, construe the user who wants to sign up to a home banking mobile app. The home banking mobile app may be protected by a submission system. The home banking mobile app needs to identify if the user is a human or not using a Turing test. The app may perform Turing test validation. In this case, the system referred as an IOT captcha manager may be installed in a mobile device.

Further, the captcha requester may ask for a test to the IoT Captcha Manager specifying the appropriate difficulty. In this case, much more the difficult requested is higher much more the test will be accurate. In one aspect, the IOT captcha manager may be identified by requesting to the local network through broadcasting protocols. In another aspect, the IOT captcha manager may be identified by getting a list of registered IoT Captcha Managers to a user account.

Based on the requested difficulty, the IoT Captcha Manager may identify different interactions that may be requested to the user according to the difficult level of the action to execute, as declared by the IOT devices. In order to raise the complexity, multiple actions may be required to be performed by the user.

In the example, the IoT devices in an area of the mobile device may be a smart speaker, a smart bulb and a smart watch. The smart speaker may be able to provide voice recognition and voice interaction with different devices. The smart bulb may be remotely controlled i.e. ON, OFF, brightness, and light color. The smart watch may be able to understand user movements like walking or jumping using gyro sensors and accelerometers.

Further, the IoT Captcha Manager may identify the smart speaker and the smart bulb as IoT devices to use. The IOT captcha manager may further define the action to be performed by the user. The actions may be change the room brightness to 50% using voice commands. The IoT Captcha Manager may send the action to the captcha requester. The captcha requester may identify which device needs to be used to prompt the user with the Turing test. The device for prompting may be identified by using the user profile and location in the room. In the example, the smartwatch may be chosen. The smartwatch may ask to the user to execute the action provided by the IoT Captcha Manager. The user may successfully execute the action. The IoT Captcha Manager may further poll all the selected IoT devices involved, reading all the required information needed to understand if any action has been performed on them. The information may be further used to understand if the requested action was made correctly or not.

In the example, when the user asks to the smart speaker to turn the brightness at 50%, the IoT Captcha Manager may capture that a command has been issued to the smart speaker and a change in status of the smart bulb. Further, the IOT captcha manager verifies that the action has been performed accordingly to the challenge that the command given to the smart speaker is related to a change of brightness, and has been performed as the bulb has changed its brightness to 50%.

Further, the IoT Captcha Manager may send a positive notification to the user and allow the user to proceed through the home banking mobile app.

Figure 2:
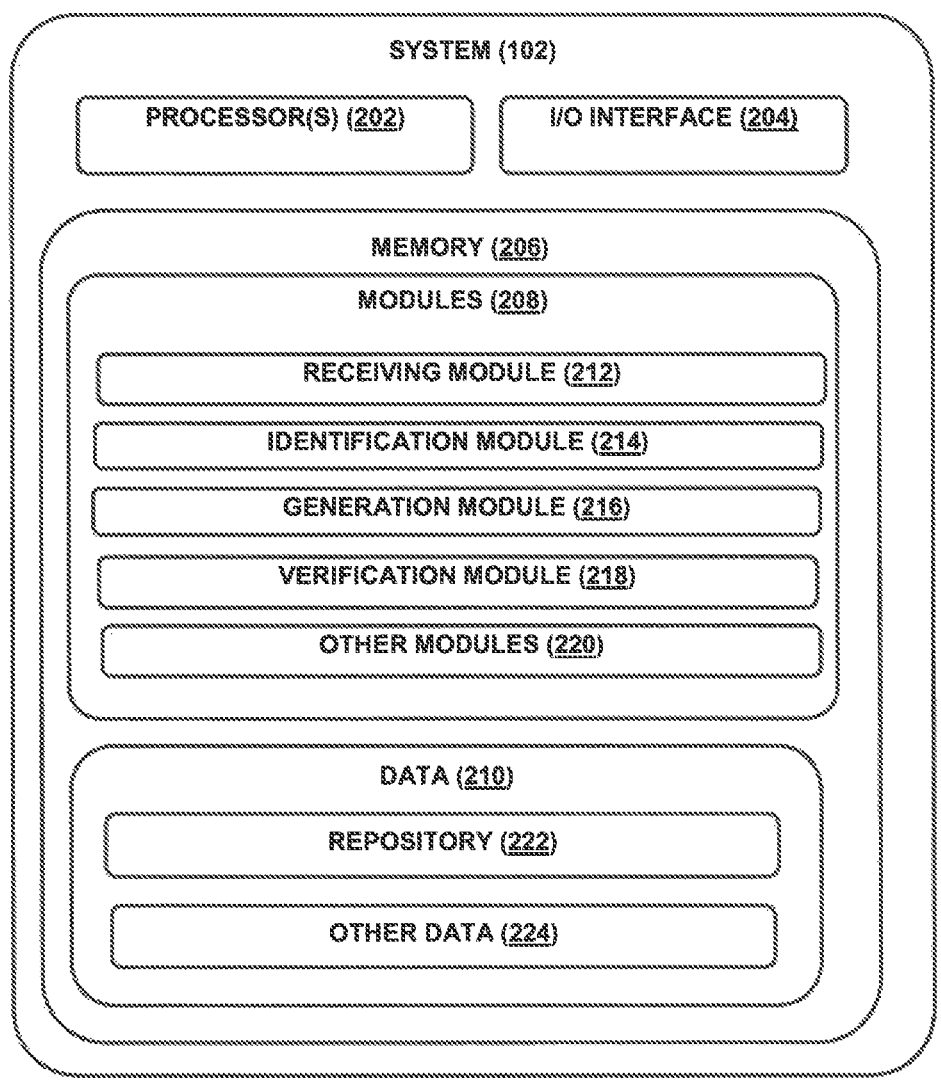
FIG. 2 illustrates the system for providing the access of an application to the user, in accordance with an embodiment of the present subject matter.

Referring now to FIG. 2, the system 102 for providing an access of an application to a user is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, an identification module 214, a generation module 216, a verification module 218 and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive a captcha request from a user device. The captcha request may be received when the user tries to access a target application. The target application may be one of a website, an application, a App, a game app and the like. In one aspect, the captcha request may be configured to initiate a turing test.

Upon receiving the captcha request, the identification module 214 may identify a set of IOT devices in a vicinity of the user device. The set of IOT devices may be identified based on a location of the user device, and a location of each IOT device from the set of IOT devices. In one aspect, the location of the user device and the location of each IOT device may be checked. Based on the locations, the set of IOT devices may be identified. The set of IOT devices may be present in a network of the user device. The set of IOT devices may comprise a smartTV, a smartwatch, a smart speaker, a smart bulb and the like.

Further, the identification module 214 may be configured to identify one or more IOT devices from the set of IOT devices. The one or more IOT devices may be nearest to the user device. In one aspect, the one or more IOT devices may be identified based on the location of each IOT device. In another aspect, the one or more IOT devices may be selected randomly, when the location of each OT device is not available.

Upon identifying the one or more IOT devices, the identification module 214 may identify one or more actions associated with the one or more TOT devices. The one or more actions may be identified based on an analysis of a user profile, user capabilities, user disabilities and the like. In other words, the one or more actions may vary from user to user even though the user device is same. This is because, the capabilities and the disabilities of each user differs.

Based on the one or more actions, the generation module 216 may generate a captcha message. The captcha message is configured to inform the user regarding the one or more actions to be performed by the user. The captcha message may prompt the user to perform the one or more actions. In one embodiment, the captcha message may comprise a sequence of the one or more actions to be performed by the user. The captcha message may be generated on the user device. In one aspect, the captcha message may be a text message, an image message, a video message, a voice message and the like. The captcha message may be referred as a notification, an alert, a pop-up and the like.

In one example, the one or more actions identified for a person who is not able to hear may be different. In the example, the captcha message may be in text format. In another example, the one or more actions identified for a person who is blind may be different. In the example, the captcha message may be the voice message.

In one exemplary embodiment, the action may be start a TV through a remote controller. In another embodiment, the action may be turn on the light or adjust its brightness in a specific way. The action may be grab an object in the environment that has been recognized by a camera. The action may be read a sentence verbally or reproduce a specific sound. The action may be make a specific movement or even move to another environment. The action may be make a specific action on an object, like start a dishwasher, flip the phone and so on. The action may be change the temperature in the environment. The action may be running or jumping to raise the heart frequency.

Once the captcha message is generated, the verification module 218 may receive one or more results associated with the one or more actions. The one or more results may be received when the user perform the one or more actions in real-time. The one or more results may be received from the one or more IOT devices. Upon receiving the one or more results, the verification module 218 may verify the one or more results. In one aspect, the one or more results may be compared with one or more predefined results associated with the one or more actions. Based on the comparison, the one or more results may be verified. The one or more predefined results may be stored in a repository. Further, the verification module 218 may check the sequence of the one or more actions performed by the user. Based on checking the sequence, the verification module 218 may verify the one or more results.

In one embodiment, the one or more results may be verified. In another embodiment, the one or more results may not be verified. If the one or more results are verified. the verification module 218 may provide the access of the target application to the user. If the one or more results are not verified, the verification module 218 may deny the access of the target application.

In one embodiment, the process of identifying the one or more IOT devices, generating the captcha message, verifying the results may correspond to the steps of the Turing test. Based on the Turing test, it may be checked if the user is a robot or a human being.

Exemplary embodiments discussed above may provide certain advantages. Though not required to practice aspects of the disclosure, these advantages may include those provided by the following features.

Some embodiments of the system and the method is configured to prompt a Turing test to a user in multiple ways.

Some embodiments of the system and the method is configured to generate a captcha foe the user based on capability and abilities of the user.

Some embodiments of the system and method is configured to allow access of a target application to the user based on real world actions through an IOT collaborative environment.

Some embodiments of the system and method for a human interactive proof.

Figure 3:
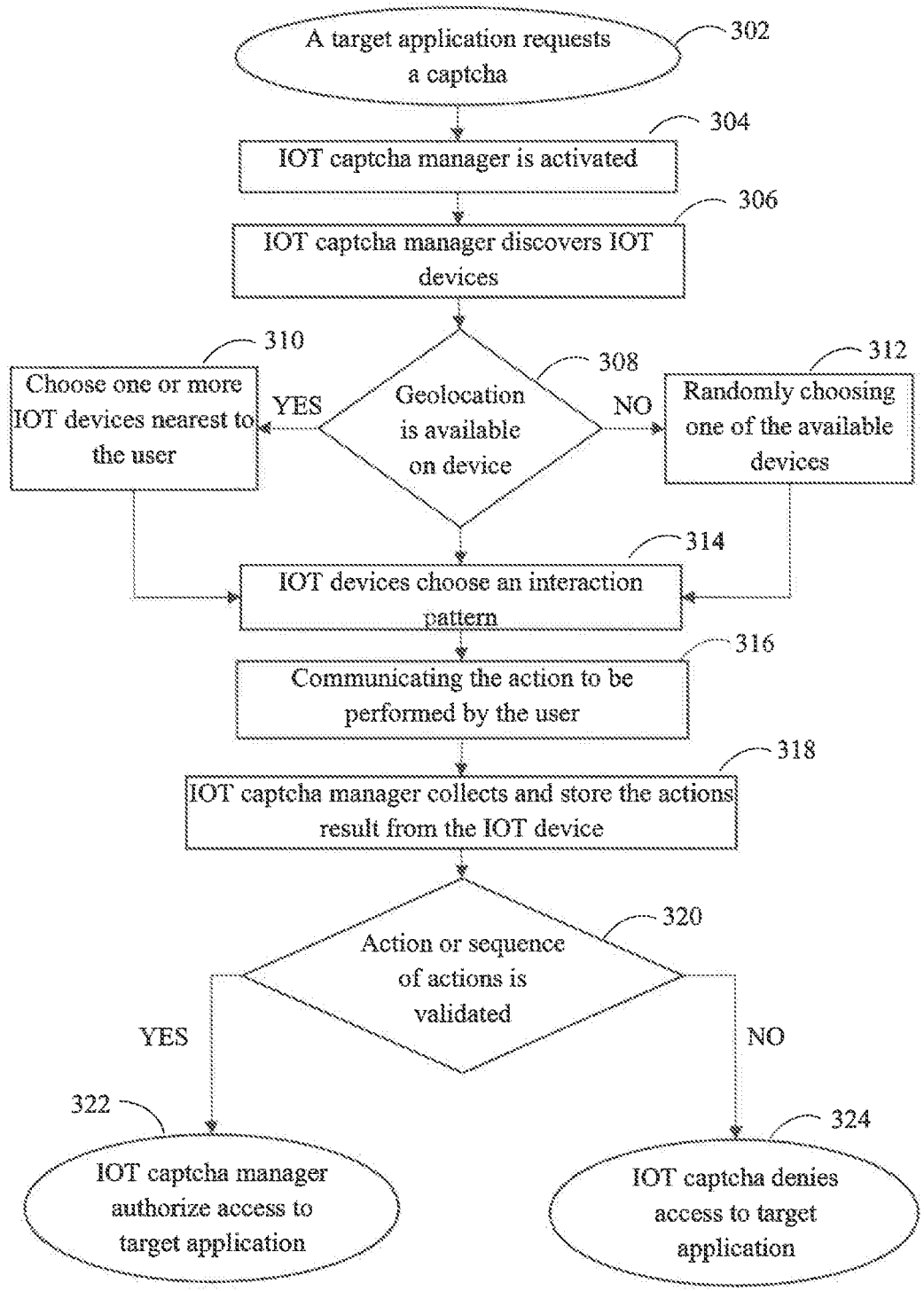
FIG. 3 illustrates a method for providing an access of an application to a user, in accordance with an embodiment of the present subject matter.

Referring now to FIG. 3, a method 300 for providing an access of an application to a user, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102. The system 102 may be referred as the IOT captcha manager.

At block 302, a captcha request may be received. In one implementation, the receiving module 212 may receive the captcha request from a user device. The captcha request may be received when the user tries to access a target application. The target application may be a website, an application, App and the like. In one example, the target application may send the captcha request.

At block 304, the IOT captcha manager may be activated upon receiving the captcha request. In one aspect, the IOT captcha manager may be activated based via a local area broadcasting. In another aspect, the IOT captcha manager may be activated via an internet using a push notification.

At block 306, a set of IOT devices may be identified. In one implementation, the identification module 214 may identify the set of IOT devices. The set of IOT devices may be available in an area of the user. At block 308, a geographical location of each IOT device from the set of IOT devices may be checked. In one embodiment, the set of device may be identified based on the geographical location of each IOT device and a location of the user device. The set of IOT devices may be available in a vicinity of the user device.

At block 310, one or more IOT devices from the set of IOT devices may be identified, when the geolocation location of each IOT device is available. The one or more IOT devices may be nearest to the user device. At block 312, the one or more IOT devices from the set of IOT devices may be selected randomly, when the geolocation of each IOT device is not available. In one implementation, the identification module 214 may identify the one or more IOT devices from the set of IOT devices.

At block 314, one or more actions associated with the one or more IOT devices may be identified. In one implementation, the identification module 214 may identify the one or more actions. The one or more actions may be identified based on an analysis of a user profile, capabilities and ability of the user, and the like. In one aspect, the one or more IOT devices may communicate the one or more actions using sensors.

At block 316, a captcha message may be generated based on the one or more actions. In one implementation, the generation module 216 may generate the captcha message. The captcha message may be one of a text message, a voice message, a video message, an image and the like. The captcha message may be generated on the user device. The captcha message may be configured to inform the user regarding the one or more actions to be performed.

At block 318, one or more results may be received from the one or more IOT devices. The one or more results may be associated with the one or more actions performed by the user. The one or more actions may be performed by the user in real-time.

At block 320, the one or more results associated with the one or more actions may be validated. In one implementation, the verification module 218 may validate the one or more results. The one or more results may be validated based on comparison of the one or more results with data stored in a repository. The data may comprise predefine results associated with the one or more actions.

At block 322, the access of the target application may be provided to the user. The user may access the target application, when the one or more results are validated. In one implementation, the verification module 218 may allow the access of the target application to the user.

At block 324, the access of the target application may be denied for the user. The access may be denied, when the one or more results are not validated.

Although implementations for systems and methods for providing an access of an application to a user have been described, it is to be understood that the appended claims are not necessarily limited to the specific features or methods described. Rather, the specific features and methods are disclosed as examples of implementations for providing the access of the application to the user.

The invention claimed is:

1. A method for providing access of an application to a user, the method comprising:
   receiving, by a processor, a captcha request from a user device, wherein the captcha request is received when a user tries to access a target application, and wherein the captcha request comprises data specifying a difficulty level for the user to perform one or more actions;
   identifying, by the processor, a set of IOT devices in a vicinity of the user device upon receiving the captcha request, wherein the set of IOT devices are identified based on a location of the user device;
   determining, by the processor, capabilities and disabilities associated with the user, based on a profile of the user;
   identifying, by the processor, one or more actions associated with one or more IOT devices from the set of IOT devices, wherein the one or more actions are identified upon analysis of the one or more IOT devices, one or more interactions of the one or more IOT devices with the user device based on the difficulty level requested in the captcha request, and the capabilities and the disabilities determined for the user;
   generating, by the processor, a captcha message on the user device, wherein the captcha message comprises the one or more actions to be performed by the user;
   verifying, by the processor, one or more results received from the one or more IOT devices, wherein the one or more results are received based on the one or more actions performed by the user in real-time; and
   providing, by the processor, an access of the target application to the user on the user device based on the validation of the one or more results.

2. The method of claim 1, wherein the one or more results are verified based on a comparison of the one or more results and one or more predefined results associated with the one or more actions.

3. The method of claim 1, wherein the captcha message is one of an: image message, a text message, or a voice message.

4. The method of claim 1, wherein the one or more IOT devices are nearest to the user device.

5. The method of claim 1, further comprises denying the access to the target application when the one or more results are not verified.

6. A system for providing access of an application to a user, the system comprising:
   a memory;
   a processor coupled to the memory, wherein the processor is configured to execute instructions stored in the memory to:
      receive a captcha request from a user device, wherein the captcha request is received when a user tries to access a target application, wherein the captcha request comprises data specifying a difficulty level for the user to perform one or more actions;
      identify a set of IOT devices in a vicinity of the user device upon receiving the captcha request, wherein the set of IOT devices are identified based on a location of the user device;
      determine capabilities and disabilities associated with the user, based on a profile of the user;
      identify one or more actions associated with one or more IOT devices, from the set of IOT devices, wherein the one or more actions are identified upon analysis of the one or more IOT devices, one or more interactions of the one or more IOT devices with the user device based on the difficulty level requested in the captcha request, and the capabilities and the disabilities determined for the user;
      generate a captcha message on the user device, wherein the captcha message comprises the one or more actions to be performed by the user;
      verify one or more results received from the one or more IOT devices, wherein the one or more results are received based on the one or more actions performed by the user in real-time; and provide an access of the target application to the user on the user device based on the validation of the one or more results.

7. The system of claim 6, wherein the one or more results are verified based on a comparison of the one or more results and one or more predefined results associated with the one or more actions.

8. The system of claim 6, wherein the captcha message is one of: an image message, a text message, or a voice message.

9. The system of claim 6, wherein the one or more IOT devices are nearest to the user device.

10. The system of claim 6, wherein the processor is further configured to execute instructions stored in the memory to deny the access to the target application when the one or more results are not verified.

* * * * *